(12) United States Patent
Kelly et al.

(10) Patent No.: US 11,588,935 B2
(45) Date of Patent: *Feb. 21, 2023

(54) FORKING TRANSMIT AND RECEIVE CALL AUDIO CHANNELS

(71) Applicant: Plantronics, Inc., Santa Cruz, CA (US)

(72) Inventors: Robert J. Kelly, San Jose, CA (US); Arun Rajasekaran, Saratoga, CA (US); Nicholas K. Eisner, Ben Lomond, CA (US)

(73) Assignee: PLANTRONICS, INC., Santa Cruz, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/185,703

(22) Filed: Feb. 25, 2021

(65) Prior Publication Data

US 2021/0185171 A1 Jun. 17, 2021

Related U.S. Application Data

(63) Continuation of application No. 16/781,827, filed on Feb. 4, 2020, now Pat. No. 10,972,603, which is a continuation of application No. 15/719,429, filed on Sep. 28, 2017, now Pat. No. 10,594,861.

(51) Int. Cl.
*H04M 3/42* (2006.01)
*H04M 3/56* (2006.01)
*H04M 7/00* (2006.01)

(52) U.S. Cl.
CPC ....... *H04M 3/42221* (2013.01); *H04M 3/568* (2013.01); *H04M 7/006* (2013.01)

(58) Field of Classification Search
CPC ... H04M 3/42221; H04M 3/568; H04M 7/006
See application file for complete search history.

(56) References Cited

U.S. PATENT DOCUMENTS

| | | | |
|---|---|---|---|
| 5,434,913 A | 7/1995 | Tung et al. | |
| 5,490,247 A | 2/1996 | Tung et al. | |
| 5,506,954 A * | 4/1996 | Arshi | H04M 3/567 |
| | | | 348/E7.083 |
| 8,654,955 B1 | 2/2014 | Lambert | |
| 9,876,901 B1 | 1/2018 | Bazzica et al. | |
| 10,375,237 B1 * | 8/2019 | Williams | G06F 16/41 |
| 2007/0004473 A1 | 1/2007 | Clark et al. | |
| 2007/0258434 A1 | 11/2007 | Williams et al. | |
| 2008/0039072 A1 | 2/2008 | Bloebaum | |
| 2008/0152122 A1 | 6/2008 | Idan et al. | |
| 2009/0055548 A1 | 2/2009 | Williams et al. | |

(Continued)

*Primary Examiner* — Melanie Jagannathan

(57) ABSTRACT

A method is disclosed for forking call audio channels. The method includes, during an active call, receiving a first audio stream of first call audio that originates from a far-end telephony device, and receiving a second audio stream of second call audio that originates from a microphone of a near-end headset. Further, the method includes generating, during the active call, a third audio stream containing the first call audio by processing the first audio stream, and generating a fourth audio stream containing the second call audio by processing the second audio stream. Still yet, the method includes, during the active call, generating a fifth audio stream containing the first call audio, and generating a sixth audio stream containing the second call audio.

20 Claims, 6 Drawing Sheets

(56) References Cited

U.S. PATENT DOCUMENTS

| | | | |
|---|---|---|---|
| 2009/0080410 A1 | 3/2009 | Aoyagi et al. | |
| 2010/0159830 A1 | 6/2010 | Findlay et al. | |
| 2011/0007907 A1* | 1/2011 | Park | G10K 11/17855 |
| | | | 381/71.8 |
| 2011/0207447 A1 | 8/2011 | Bhow | |
| 2013/0064142 A1 | 3/2013 | Bhow | |
| 2013/0110565 A1 | 5/2013 | Means, Jr. et al. | |
| 2014/0068007 A1 | 3/2014 | O'Gorman | |
| 2014/0086425 A1 | 3/2014 | Jensen et al. | |
| 2014/0274004 A1 | 9/2014 | Koll | |
| 2015/0086005 A1 | 3/2015 | Kechichian et al. | |
| 2015/0269953 A1 | 9/2015 | Siami | |
| 2016/0072949 A1 | 3/2016 | Kannappan et al. | |
| 2016/0073185 A1 | 3/2016 | Kannappan et al. | |
| 2016/0127536 A1* | 5/2016 | Jayapalan | H04L 63/1408 |
| | | | 379/265.02 |
| 2016/0192056 A1 | 6/2016 | Goldman et al. | |
| 2016/0227029 A1* | 8/2016 | Wolfeld | H04L 65/1083 |
| 2017/0026512 A1* | 1/2017 | Ezell | H04L 65/1083 |
| 2017/0103774 A1 | 4/2017 | Sorensen | |
| 2017/0366496 A1 | 12/2017 | Habermehl et al. | |
| 2018/0115744 A1 | 4/2018 | Bayley et al. | |
| 2022/0353309 A1* | 11/2022 | Grover | H04L 65/4015 |

\* cited by examiner

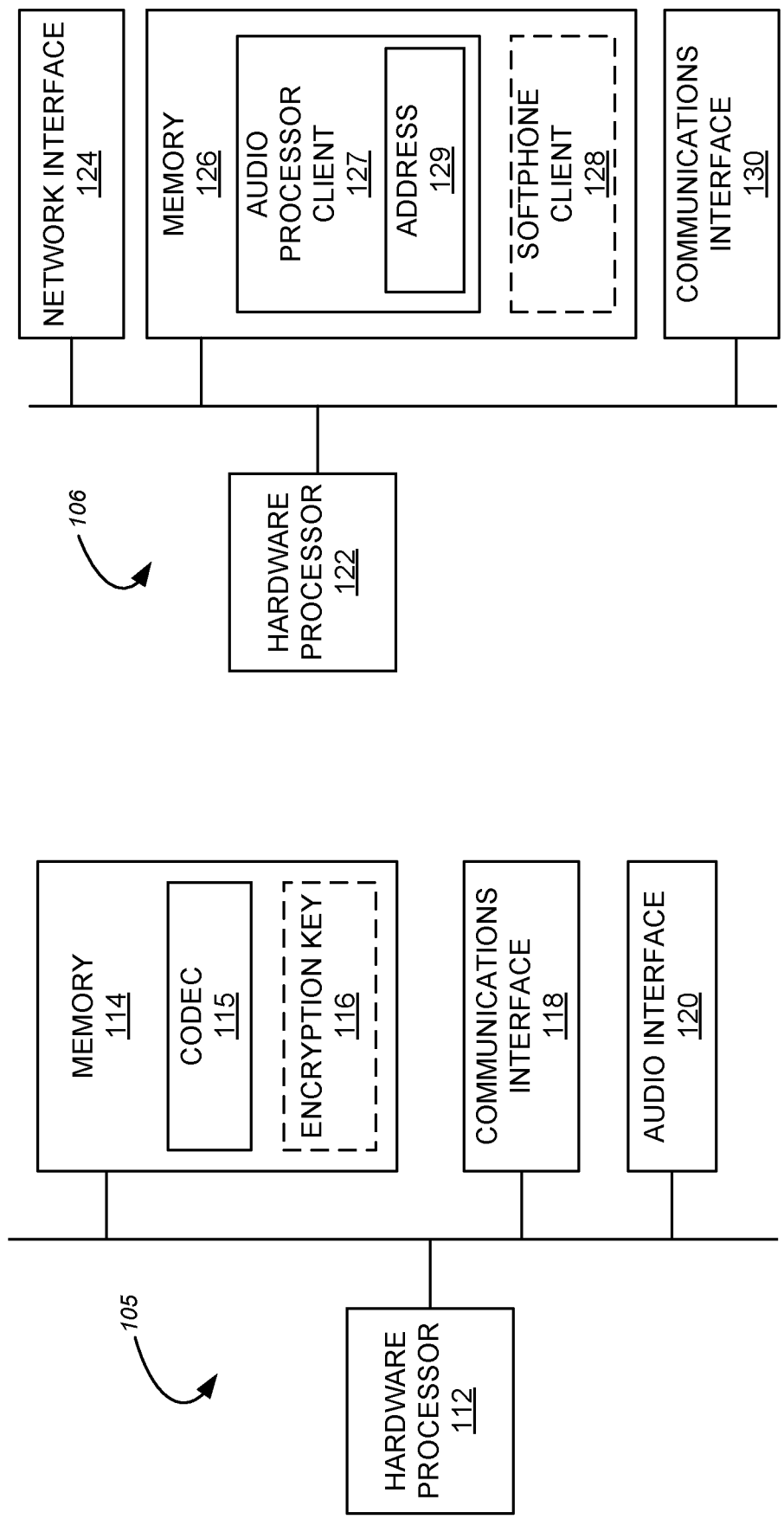

FORKING TRANSMIT AND RECEIVE CALL AUDIO CHANNELS

CROSS REFERENCE TO RELATED APPLICATIONS

This application is a continuation of, and thereby claims benefit under 35 U.S.C. § 120 to, U.S. patent application Ser. No. 16/781,827, filed Feb. 4, 2020. U.S. patent application Ser. No. 16/781,827 is a continuation of, and thereby claims benefit under 35 U.S.C. § 120 to, U.S. patent application Ser. No. 15/719,429, filed Sep. 28, 2017 (now U.S. Pat. No. 10,594,861, issued Mar. 17, 2020). U.S. patent application Ser. Nos. 15/719,429 and 16/781,827 are incorporated herein by reference in their entirety.

FIELD

The present disclosure relates generally to the field of call audio processing. More particularly, the present disclosure relates to recording phone call audio in customer service centers for subsequent analysis and storage.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Current methods for recording call center conversations are largely restricted to trunk-side recording, extension-side recording, and Voice over Internet Protocol (VoIP) recording. In trunk-side recording, phone calls are recorded at the point where calls come in from a phone provider. Trunk-side recording renders it difficult to identify calls based on an internal extension, and to monitor calls in real-time. In extension-side recording, phone calls are recorded at each internal extension. Extension-side recording systems suffer from compatibility issues, and can be extremely expensive. VoIP recording is further broken down into three primary types: central active recording, gateway-side passive VoIP recording, and station-side passive voice recording. In central active recording, recording can occur anywhere in an Internet Protocol (IP)-based network by initiating a third-party conference into the call that is recorded. In gateway-side passive VoIP recording, the calls are tapped at a gateway or router, at the edge of a customer's network, and may rely on the analysis of network traffic to identify calls. In station-side passive voice recording, the calls are tapped by a recorder at the network connection for each phone. In practice, these call recording solutions rely on, and are closely tied to, the call center's VoIP or PBX infrastructure. As a result, the selection of a call recording mechanism may be dictated by the previously-installed infrastructure. Further, installation of these systems may be complex or disruptive to the work environment, and, once installed, may be associated with prohibitively expensive licensing costs.

SUMMARY

In general, in one aspect, a method is disclosed for forking transmit and receive call audio channels. The method includes, during an active call, receiving a first audio stream of first call audio. The first call audio originates from a far-end telephony device. Also, the method includes, during the active call, receiving a second audio stream of second call audio. The second call audio originates from a microphone of a near-end headset. Further, the method includes generating, during the active call, a third audio stream containing the first call audio by processing the first audio stream, and generating a fourth audio stream containing the second call audio by processing the second audio stream. Still yet, the method includes, during the active call, generating a fifth audio stream containing the first call audio, and generating a sixth audio stream containing the second call audio. In addition, the method includes, during the active call, concurrently transmitting the third audio stream and fifth audio stream, and concurrently transmitting the fourth audio stream and sixth audio stream.

In general, in one aspect, a system is disclosed for forking transmit and receive call audio channels. The system includes at least one processor, and at least one memory coupled to the at least one processor. The at least one memory stores instructions that, when executed by the at least one processor, cause the at least one processor to perform a process. The process includes, during an active call, receiving a first audio stream of first call audio that originates from a far-end telephony device. The process also includes receiving, during the active call, a second audio stream of second call audio that originates from a microphone of a near-end headset. Further, the process includes generating, during the active call, a third audio stream containing the first call audio by processing the first audio stream. Still yet, the process includes generating, during the active call, a fourth audio stream containing the second call audio by processing the second audio stream. Further, the process includes, during the active call, generating a fifth audio stream containing the first call audio and generating a sixth audio stream containing the second call audio. In addition, the process includes, during the active call, concurrently transmitting the third audio stream and fifth audio stream, and concurrently transmitting the fourth audio stream and sixth audio stream.

In general, in one aspect, a system is disclosed for forking transmit and receive call audio channels. The system includes a first receive channel that is configured to receive first call audio from a microphone of a headset. The system also includes a second receive channel that is configured to receive second call audio originating from a far-end telephony device. Additionally, the system includes a signal processing block configured to generate processed first call audio by processing the first call audio, and to generate processed second call audio by processing the second call audio. The system includes a first transmit channel configured to transmit the processed first call audio, as a first audio stream, for receipt by the far-end telephony device, and includes a second transmit channel configured to transmit the processed second call audio, as a second audio stream, to a speaker of the headset. Furthermore, the system includes a third transmit channel. The third transmit channel is configured to receive the first call audio via a first path and to receive the processed first call audio via a second path. The first path bypasses the signal processing block. The third transmit channel is configured to selectively output, as a third audio stream, one of the first call audio and the processed first call audio. The system also includes a fourth transmit channel configured to receive the second call audio via a third path, and to receive the processed second call audio via a fourth path. The third path bypasses the signal processing block. The fourth transmit channel is configured to selectively output, as a fourth audio stream, one of the second call audio and the processed second call audio. The system further includes a mute control block configured to selectively mute the processed first call audio on the first transmit channel.

The details of one or more implementations are set forth in the accompanying drawings and the description below. Other features will be apparent from the description and drawings, and from the claims.

DESCRIPTION OF DRAWINGS

FIGS. 1A-1E depict systems for forking transmit and receive call audio channels, in accordance with one or more embodiments of the invention.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

Prior art methods for recording call center conversations are problematic for various reasons. Some methods place the recording instrumentality at a network location, such as at the edge of a network, that makes it difficult or impossible to differentiate between the near-end speaker and far-end speaker. Some methods rely on station-side hardware that is closely tied to the network infrastructure, and which can give rise to prohibitively expensive licensing costs.

In general, embodiments of the invention provide a system, a method, and a computer readable medium for call audio forking in a manner that is largely infrastructure-agnostic. The systems and methods disclosed herein access the analog and/or digital audio signals in the send and receive channels of a user's near-end telephony device, and operate independently of the near-end VoIP or PBX infrastructure. Moreover, because the systems and methods described herein independently access and manipulate the contents of the send and receive channels, the send and receive channels of a call may be separately analyzed and recorded, thereby providing powerful insight into conversation dynamics at both an individual agent and enterprise level, in real-time and in the aggregate over an extended period of time.

Figure 1A:
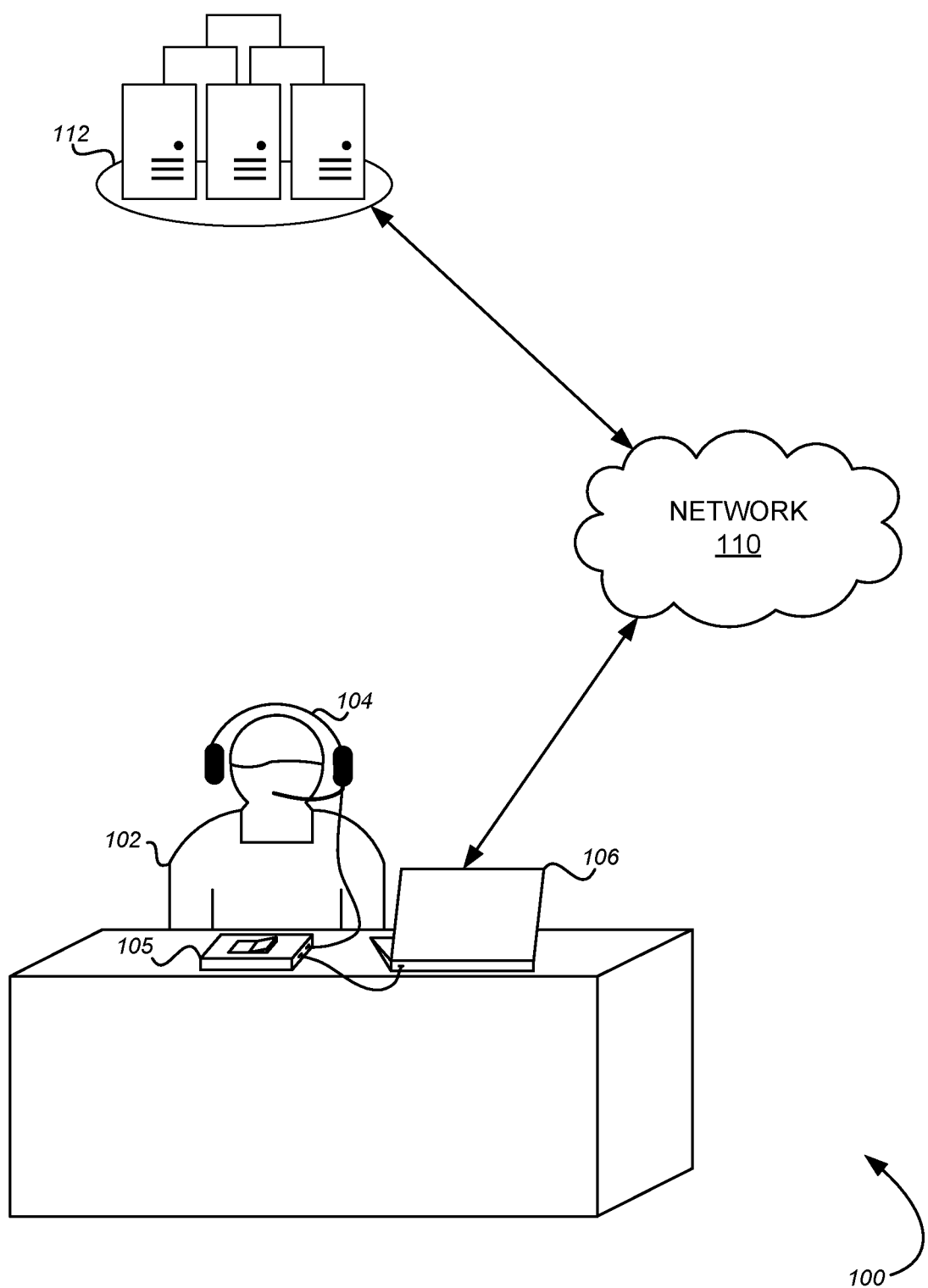

FIG. 1A shows a system 100 according to one or more embodiments. Although the elements of the system 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1A may be omitted, repeated, and/or substituted. Accordingly, various embodiments may lack one or more of the features shown. For this reason, embodiments of the invention should not be considered limited to the specific arrangements of elements shown in FIG. 1A.

As shown in FIG. 1A, the system 100 includes a host device 106, an audio processor 105, a headset 104, a network 110 communicatively coupled with the host device 106, and a remote server 112 communicatively coupled with the network 110. As described herein, the network 110 includes any private and/or public communications network, wired and/or wireless, such as a local area network (LAN), wide area network (WAN), and/or the Internet. For example, the network 110 may include a public switched telephone network (PSTN), a cellular network, an integrated services digital network (ISDN), and/or a wireless local area network (WLAN), that support standards such as Ethernet, wireless fidelity (Wi-Fi), and/or VoIP.

The remote server 112 includes one or more remote computing devices that are accessible to the host device 106 over the network 110 for storage and/or processing of data received from the host device 106. The data received from the host device 106 may include one or more channels of audio data and/or metadata describing the one or more channels of audio data. The remote server 112 may include, for example, a session initiation protocol (SIP) server, a Real-time Transport Protocol (RTP) server, a Real-time Transport Control Protocol (RTCP) server, and/or a media server. The remote server 112 may include a data repository for storing data received from the host device 106. The remote server 112 may include processing capabilities for analyzing a content of the data received from the host device 106. For example, the remote server 112 may perform analysis, such as machine learning, on call audio streams received from the host device 106. By collecting and analyzing the call audio streams received from multiple host devices 106, which are delivered during dozens, hundreds, thousands, or even more calls across multiple users 102, trends and events that may have a significant impact on an enterprise can be identified in near real-time.

As described herein, the host device 106 includes any computing device capable of storing and processing digital information on behalf of a user 102. In one or more embodiments, and as depicted in FIG. 1A, the host device 106 comprises a computer (i.e., laptop computer, etc.). However, for reasons that will become clear upon reading the present disclosure, it is understood that the host device 106 may comprise a desktop computer, smartphone, tablet computer, VoIP desk phone, or other computing device of the user 102. As described herein, the user 102 includes a person. In one or more embodiments, the user 102 may be an agent, such as a call center agent, that makes and receives phone calls on behalf of a business. For example, the user 102 may be a technical support agent, a travel agent, a sales agent, a customer service agent, etc.

As depicted in FIG. 1A, the user 102 sends and receives phone call audio using a headset 104 that is in communication with a softphone client executing on the host device 106. The headset 104 includes any hardware device including a microphone operable to convert acoustic vibrations into electrical signals, and a speaker operable to convert electrical signals into acoustic vibrations, for sending and receiving sound, including human speech, to and from a far-end caller. The headset 104 may include any body-worn device with a speaker proximate to an ear of the user 102, and a microphone for monitoring the speech of the user 102. Accordingly, the headset 104 may include a monaural or stereo device, whether worn by the user 102 over-the-ear (e.g., circumaurally, etc.), in-ear, or on-ear (e.g., supraaurally, etc.).

As depicted in FIG. 1A, the host device 106 provides near-end telephone functionality by way of a softphone client executing thereon. However, in one or more embodiments, and as described below, such functionality may be provided by another near-end telephony device, such as a mobile phone (e.g., smartphone, etc.) or desktop telephone (i.e., a deskphone, etc.), any of which may directly interface with the audio processor 105. Accordingly, in such embodiments, the systems and methods described herein may be implemented without a softphone client executing on the host device 106.

The audio processor 105 includes hardware and/or software that is configured to process call audio originating from the headset 104 for delivery to a far-end caller, and to independently process received call audio originating from the far-end caller for delivery to the headset 104. In one or more embodiments, processing the call audio may include encoding or decoding the call audio. Further, processing the call audio may include applying one or more digital signal processing operations (e.g., filtering, amplifying, equalizing, etc.) to the call audio. In one or more embodiments, the audio processor 105 may concurrently forward to the server 112 processed call audio originating from both the headset 104 and a far-end speaker. In one or more embodiments, the audio processor 105 may forward the processed call audio originating from both the headset 104 and the far-end caller to the host device 106, which is configured to forward the processed call audio on to the remote server 112.

In other words, the audio processor 105 may fork, in real-time, a stream of call audio received from a far-end caller such that the first stream of call audio is delivered to both the headset 104 of the user 102, and to the remote server 112 for storage and/or analysis; and fork, in real-time, a second stream of call audio received from the headset 104 such that the second stream of call audio is delivered to both the far-end caller, and to the remote server 112 for storage and/or analysis. Thus, the audio processor 105 may copy a version of both the independent transmit and receive channels of the headset 104, and sends the copies to the remote server 112 using standard protocols. These protocols may include, for example, SIP, RTP, and/or RTCP. As described herein, a channel includes any electronic circuit, whether digital or analog, that serves as a path for an audio stream. Moreover, an audio stream includes any continuously delivered signal, whether digital or analog, containing audio content that is rendered or processed as it arrives at a destination and without waiting for a terminus of the audio content.

In this way, and as described below, the audio processor 105 provides for a method of call recording that overcomes the technical and economic challenges of prior art call recording solutions. In particular, because of the position of the audio processor 105 in the audio path between a far-end speaker and a headset of a near-end speaker, the audio processor 105 may readily distinguish between the send and receive channels. This allows the audio processor 105 to independently process and forward the send and receive channels to the server 112. Accordingly, the audio processor 105 effectively allows for call recording on a per-channel and per-station basis, avoiding the problems inherent to trunk-side or gateway-side recording mechanisms. Moreover, unlike other prior art solutions, the audio processor 105 does not require initiating a third-party conference into a call, and does not require additional network hardware for tapping into the network connection at a VoIP phone. Still yet, because both the send and receive channels for an active call pass through the audio processor 105 adjacent to the headset 104, the audio processor 105 does not rely on a particular VoIP or PBX infrastructure, and therefore may be installed and configured with little difficulty or cost. As a result, the audio processor 105 may provide for inexpensive, infrastructure independent, real-time call audio recording for subsequent storage and analysis.

FIG. 1B depicts a block diagram of the audio processor 105, according to one or more embodiments. Although the elements of the audio processor 105 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1B may be omitted, repeated, and/or substituted. Accordingly, various embodiments may lack one or more of the features shown. For this reason, embodiments of the invention should not be considered limited to the specific arrangements of elements shown in FIG. 1B.

As shown in FIG. 1B, the audio processor 105 includes a hardware processor 112 operably coupled to a memory 114, a communications interface 118, and an audio interface 120. In one or more embodiments, the hardware processor 112, the memory 114, the communications interface 118, and the audio interface 120 may remain in communication over one or more communication busses. Although not depicted in FIG. 1B for purposes of simplicity and clarity, it is understood that, in one or more embodiments, the audio processor 105 may include one or more of a display, a visual indicator (e.g., light emitting diode, etc.), a haptic device, and a user-operable control (e.g., a button, slide switch, capacitive sensor, touch screen, etc.). For example, the audio processor 105 may include a user-operable control that selectively enables the transmit/receive channels of two or more near-end telephony devices (e.g., a desk phone and a softphone, etc.) communicatively coupled to the audio processor 105. More specifically, the audio processor 105 may include call mixing or switching functionality, enabling a user to make and receive calls using a headset that is connected to multiple telephony devices, as described below. As another example, the audio processor 105 may include one or more of a call answer control, a call end control, a mute control, and a call volume control.

As described herein, the communications interface 118 includes any interface for transmitting a first call audio stream to, and receiving a second call audio stream from, the host device 106. Accordingly, the communications interface 118 includes a receive channel, for receiving an audio stream from the host device 106; and a transmit channel, for transmitting to the host device 106 audio picked up by a headset microphone.

In one or more embodiments, the communications interface 118 includes a Universal Serial Bus (USB) transceiver or USB microcontroller. In one or more embodiments, the communications interface 118 includes a wireless transceiver and antenna coupled to the wireless transceiver. Accordingly, by way of a wireless transceiver and antenna, the audio processor 105 may form a wireless link with the host device 106. The wireless transceiver may be, for example, a DECT transceiver, Bluetooth transceiver, or IEEE 802.11 (Wi-Fi) transceiver.

As described herein, the audio interface 120 includes any interface for outputting a call audio stream to a speaker of a headset device, and for receiving an input audio stream from a microphone of the headset device. Accordingly, the audio interface 120 includes a receive channel, for receiving the audio stream picked up by the microphone of the headset; and a transmit channel, for transmitting, to the headset, audio received at the communications interface 118 from the host device 106. In one or more embodiments, the audio interface 120 may include a USB interface or wireless transceiver (e.g., DECT, Bluetooth, Wi-Fi, etc.) connected to the headset. In one or more embodiments, the audio interface 120 may include an analog headset interface, for interfacing with an analog headset.

As described herein, the memory 114 includes any storage device capable of storing information temporarily or permanently. The memory 114 may include volatile and/or non-volatile memory, and may include more than one type of memory. For example, the memory 114 may include one or more of SDRAM, ROM, and flash memory.

As depicted in FIG. 1B, the memory 114 stores a codec 115, which may be executed by the hardware processor 112. Using the codec 115, the hardware processor 112 may encode and/or decode audio streams that are received via the communications interface 118 and/or the audio interface 120. In one or more embodiments, the codec 115 may be used to compress and/or decompress audio streams that are received via the communications interface 118 and/or the audio interface 120. For purposes of simplicity and clarity, a single codec 115 is shown stored in the memory 114, however it is understood that, in one or more embodiments, the memory 114 may store a plurality of codecs of varying bitrates, sampling rates, compression rates, etc. In one or more embodiments, the memory 114 may include an encryption key 116. Using the encryption key 116, the hardware processor 112 may encrypt and/or decrypt audio streams that are received via the communications interface 118 and/or the audio interface 120.

As described herein, the hardware processor 112 processes data, including the execution of software, such as audio processing algorithms, stored in the memory 114. In particular, using the codec 115, the hardware processor 112 encodes a first audio stream that originates from a microphone of a headset, and decodes a second audio stream that originates from a far-end caller. The encoded and decoded audio streams may be compressed, decompressed, encrypted, and/or decrypted, as appropriate, by the hardware processor 112. For example, a call audio stream received at the audio processor 105 via the communications interface 118 may be decoded. The decoded audio stream may then be output to a speaker via the audio interface 120. In the other direction, a call audio stream picked up by a microphone and received at the audio processor 105 via the audio interface 120 may be encoded, compressed, and/or encrypted prior to being output by the audio processor 105 over the communications interface 118.

In one or more embodiments, the hardware processor 112 is a high performance, highly integrated, and highly flexible system-on-chip (SOC). In one or more embodiments, the hardware processor 112 includes signal processing functionality. For example, the hardware processor 112 may perform one or more of echo cancellation, echo reduction, gain control, equalization, volume control, noise reduction, acoustic exposure limiting, and acoustic event identification. In one or more embodiments, the hardware processor 112 may include a variety of processors (e.g., digital signal processors, etc.), analog-to-digital converters, digital-to-analog converters, etc., with conventional CPUs being applicable.

FIG. 1C depicts a block diagram of the host device 106, according to one or more embodiments. Although the elements of the host device 106 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1C may be omitted, repeated, and/or substituted. Accordingly, various embodiments may lack one or more of the features shown. For this reason, embodiments of the invention should not be considered limited to the specific arrangements of elements shown in FIG. 1C.

As shown in FIG. 1C, the host device 106 includes a hardware processor 122 operably coupled to a memory 126, a network interface 124, and a communications interface 130. In one or more embodiments, the hardware processor 122, the memory 126, the network interface 124, and the communications interface 130 may remain in communication over one or more communication busses. Although not depicted in FIG. 1C for purposes of simplicity and clarity, it is understood that, in one or more embodiments, the host device 106 may include one or more of a display, a haptic device, and a user-operable control (e.g., a button, slide switch, capacitive sensor, touch screen, etc.).

The network interface 124 allows for communication, using digital and/or analog signals, with one or more other devices over a network. The network may include the network 110, described above in reference to FIG. 1A. Using the network interface 124, the host device 106 may send one or more call audio streams to one or more remote devices over the network. For example, via the network interface 124, the host device 106 may simultaneously output a plurality of call audio streams to a far-end caller and a remote server. Also, via the network interface 124, the host device 106 may receive one or more call audio streams from one or more remote devices. For example, via the network interface 124, the host device 106 may receive a call audio stream that originates from a far-end caller.

As described herein, the communications interface 130 includes any interface for transmitting a first call audio stream to, and receiving a second call audio stream from, the audio processor 105. Accordingly, the communications interface 130 includes a receive channel, for receiving an audio stream from the audio processor 105; and a transmit channel, for transmitting to the audio processor 105 a call audio stream received over a network (e.g., via the network interface 124, etc.).

In one or more embodiments, the communications interface 130 includes a USB transceiver or USB microcontroller. In one or more embodiments, the communications interface 130 includes a wireless transceiver and antenna coupled to the wireless transceiver. The wireless transceiver may be, for example, a DECT transceiver, Bluetooth transceiver, or IEEE 802.11 (Wi-Fi) transceiver.

The memory 126 includes any storage device capable of storing information temporarily or permanently. The memory 126 may include volatile and/or non-volatile memory, and may include more than one type of memory. For example, the memory 126 may include one or more of SDRAM, ROM, and flash memory. As depicted in FIG. 1C, the memory 126 includes an audio processor client 127. In one or more embodiments, the audio processor client 127 may control operation of the audio processor 105. For example, the audio processor client 127 may selectively activate a codec in the memory 114 of the audio processor 105. In one or more embodiments, the audio processor client 127 may itself perform one or more of encoding, decoding, compression, decompression, encryption, and/or decryption of an audio stream before or after the audio stream is processed by the audio processor 105.

Further, as depicted in FIG. 1C, the audio processor client 127 includes a destination address 129 of one or more remote servers, such as the remote server 112, described in the context of FIG. 1A, above. During an active call, for which call audio is being processed by the audio processor 105, the audio processor client 127 may transmit, via the network interface 124, two streams of call audio to the servers at the destination address 129. The transmission of the two streams of call audio to the servers may occur concurrently with the transmission of a third stream of call audio to a far-end caller, as described below.

The hardware processor 122 processes data, including the execution of applications stored in the memory 126. For example, the hardware processor 122 may execute the audio processor client 127, described above. In one or more embodiments, the hardware processor 122 may include a variety of processors (e.g., digital signal processors, etc.), analog-to-digital converters, digital-to-analog converters, etc., with conventional CPUs being applicable.

As an option, the memory 126 may include a softphone client 128 executable by the hardware processor 122. The softphone client 128 may include any application on the host device 106 that allows a user of the host device 106 to send and receive VoIP communications (e.g., VoIP calls, etc.) using the host device 106. Examples of commercially available softphone clients include Microsoft® Skype®, Microsoft® Skype for Business, Cisco® IP Communicator, Cisco Jabber®, Cisco Spark®, Broadsoft® UC-One®, Avaya® Communicator, and Avaya® IP Softphone. The audio processor client 127 and/or the softphone client 128 may support, for example, one or more of Session Initiation Protocol (SIP), H.323, Media Gateway Control Protocol (MGCP), Real-time Transport Protocol (RTP), Real-time Transport Control Protocol (RTCP), Secure Real-time Transport Protocol (SRTP), Session Description Protocol (SDP), Skinny Client Control Protocol (SCCP), and Inter-Asterisk eXchange (IAX) protocol.

For purposes of simplicity and clarity, the audio processor 105 and host device 106 of FIGS. 1A, 1B, 1C, and 1D are depicted as being discrete physical devices. However, in one or more embodiments, the audio processor 105 and host device 106 may be integrated in a single device. For example, the audio processor 105 and the host device 106 may be integrated within a headset, a desktop computer, a VoIP desk phone, a laptop computer, or smartphone. As another example, in one or more embodiments, the methods and processes performed by the audio processor 105 may be performed by software executing at a host device 106.

In one or more embodiments, one or both of the audio processor 105 and the host device 106 may generate metadata describing one or more audio streams that are sent and/or received. For example, the audio processor 105 may generate metadata describing an audio stream originating from a local microphone and received via the audio interface 120. As another example, the audio processor 105 may generate metadata describing an audio stream originating from a far-end caller and received via the communications interface 118. As a further example, the audio processor client 127 may generate metadata describing an audio stream received from the audio processor 105 via the communications interface 130, and/or may generate metadata describing an audio stream received from a far-end speaker via the network interface 124. Accordingly, the audio processor 105 and the host device 106 may together generate metadata describing audio received from and/or sent to a far-end speaker during a phone call.

The metadata may include data that offers insight into conversation dynamics, such as, for example, a duration or percentage of near-end only speech activity, a duration or percentage of far-end only speech activity, and/or a duration or percentage of overtalk activity (i.e., concurrent speech activity from both the near-end and far-end speakers, etc.). The metadata may include data that identifies discrete acoustic events, such as, for example, acoustic shock events exceeding a predetermined volume threshold. Still yet, the metadata may include data that describes, for example, a duration or percentage of send or receive activity exceeding a predetermined volume threshold, or a duration or percentage of silence on both the send and receive channels. Also, the metadata may include data that describes, for example, a signal envelope of an audio stream transmitted on a send channel, and/or a signal envelope of an audio stream received on a receive channel. The metadata may include data that describes, for example, interactions with user controls by a near-end caller, such as, for example, user operations to increase call volume, user operations to decrease call volume, user operations to mute a transmit channel, and/or user operations to unmute a transmit channel. Also, the metadata may include data that describes, for example, call events such as a call date, call start time, call end time, a caller identifier, a user identifier, a call identifier.

Figure 1D:
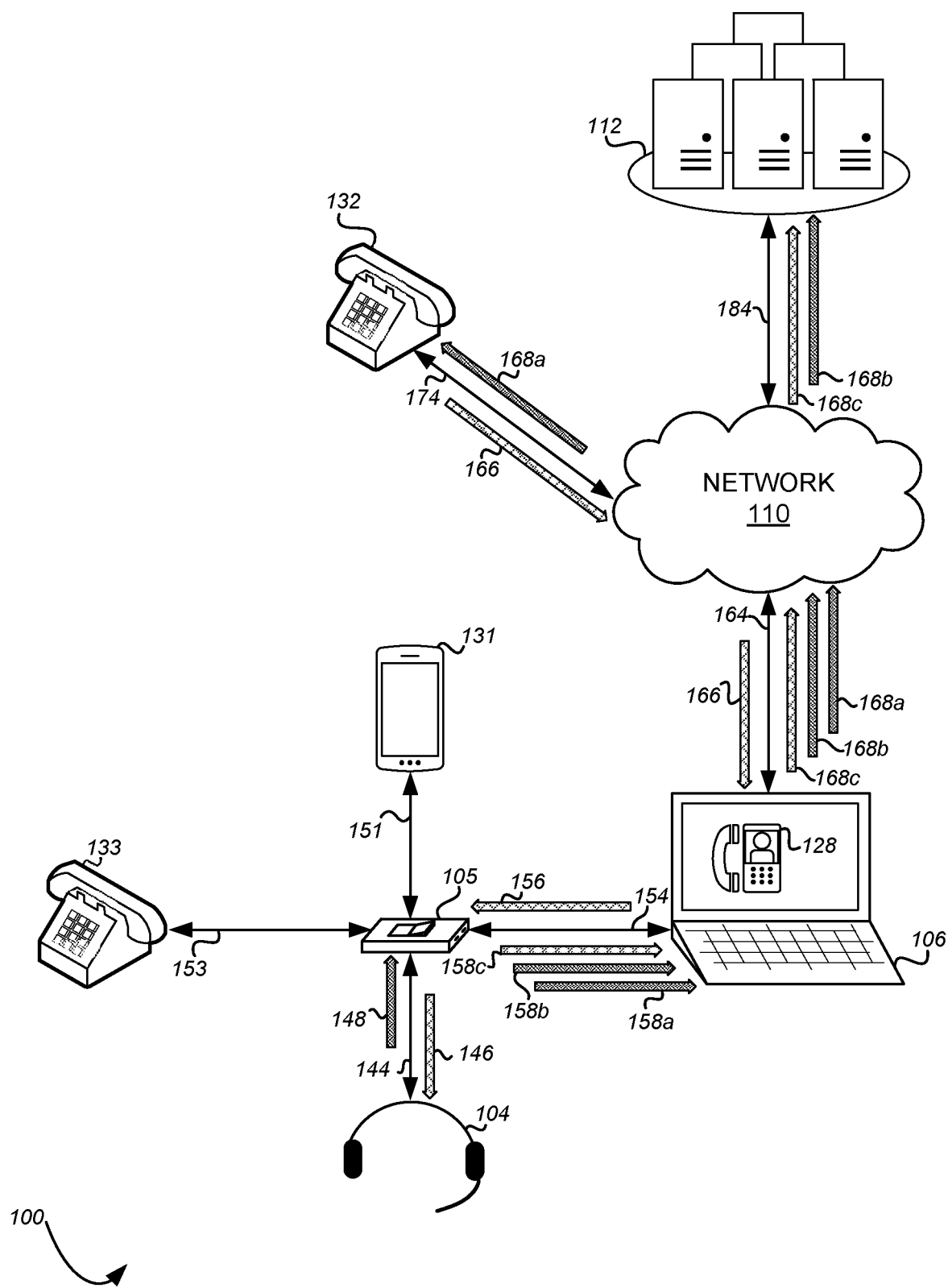

FIG. 1D shows another view of the system 100, according to one or more embodiments. Although the elements of the system 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1D may be omitted, repeated, and/or substituted. Accordingly, various embodiments may lack one or more of the features shown. For this reason, embodiments of the invention should not be considered limited to the specific arrangements of elements shown in FIG. 1D.

As depicted in FIG. 1D, the audio processor 105 is communicatively coupled to one or more near-end telephony devices. For example, as illustrated, the audio processor 105 may be connected to one or more of a softphone client 128 on a host device 106, a mobile phone 131, and a desktop phone 133. Also, a headset 104 is communicatively coupled to the audio processor 105. Thus, one or more of the softphone client 128, the mobile phone 131, and the desktop phone 133 may send call audio to and receive call audio from the headset 104 via the audio processor 105. As described herein, the desktop phone 133 may include any hardware device with a dialpad that is utilized to make outgoing telephone calls and/or receive incoming telephone calls.

In the context of the description of FIG. 1D, it is assumed that a phone call is active between a user at a far end (i.e., a far-end speaker, far-end caller, etc.), and a user that is wearing the headset 104 connected to the audio processor 105 (i.e., a near-end speaker, near-end caller, etc.). The far-end speaker utilizes a far-end telephony device 132 to participate in the phone call. The far-end telephony device 132 may be a cellular phone, landline phone, VoIP phone, etc.

The coupling of the headset 104 and the audio processor 105 includes a pair of transmit/receive channels 144. As noted above, the transmit/receive channels 144 may reside on a wired or wireless communication medium, such as, for example, the audio interface 120, described in the context of FIG. 1B, above. The transmit/receive channels 144 includes a first channel by which the audio processor 105 receives a first audio stream 148 from the headset 104, and a second channel by which the audio processor 105 transmits a second audio stream to the headset 104. Similarly, a pair of transmit/receive channels 154 communicatively couple the audio processor 105 to the host device 106. The transmit/receive channels 154 may reside on a wired or wireless communication medium, such as, for example, the communications interfaces 118 and 130, described in the context of FIGS. 1B and 1C, above. Further still, a pair of transmit/receive channels 164 communicatively couple the host device 106 to the network 110, a pair of transmit/receive channels 174 communicatively couple the far-end telephony device 132 to the network 110, and a pair of transmit/receive channels 184 communicatively couple the remote server 112 to the network 110. The transmit/receive channels 174 and 184 may include any portion of the network 110 (e.g., cellular, PSTN, Internet, etc.), the details of which are beyond the scope of the present disclosure.

The audio processor 105 receives a first audio stream 148 from the headset 104, and transmits a second audio stream 146 to the headset 104. Both the audio streams include call audio. In particular, call audio in the first audio stream 148 is received from the headset 104 by way of a microphone of the headset 104, and the second audio stream 146 includes call audio originating from the far-end telephony device 132. More specifically, as illustrated in FIG. 1D, the second audio stream 146 begins as a transmitted audio stream 166 from the far-end telephony device 132, traverses the network 110, and is received at the softphone client 128 of the host device 106. The audio stream 166 may be transmitted as an analog audio signal between one or more telephone exchanges, and/or as a digital signal, such as packets (e.g., User Datagram Protocol, Transmission Control Protocol, etc.) over an IP network (e.g., the network 110, etc.). The host device 106 processes the received audio stream 166 and forwards to the audio processor 105 as received audio stream 156. For example, the host device 106 may reconstruct (e.g., depacketize, etc.) the audio stream 166 from the network 110 before forwarding to the audio processor 105, over the transmit/receive channels 154, as the received audio stream 156.

In one or more embodiments, the audio processor 105 processes the received audio stream 156 before sending on to the headset 104 as the second audio stream 146. For example, the audio processor 105 may decode the received audio stream 156 before sending to the headset 104 as the second audio stream 146. In one or more embodiments, the audio processor 105 may perform one or more of echo cancellation, echo reduction, gain control, equalization, volume control, noise reduction, acoustic exposure limiting, and acoustic event identification on the received audio stream 156 to generate the second audio stream 146. Accordingly, the call audio originating from the far-end telephony device 132 may be modified to increase clarity, reduce artifacts, etc. before being sent on to the headset 104 as the second audio stream 146. In one or more embodiments, the audio processor 105 may simply pass the received audio stream 156 on to the headset 104 as the second audio stream 146, without any modifications. In one or more embodiments, the host device 106 and/or the audio processor 105 may generate metadata describing the contents of the received audio stream 156.

Still yet, as noted above, during the call between the near-end speaker and the far-end speaker at the far-end telephony device 132, the audio processor 105 receives the first audio stream 148 from the headset 104. As illustrated, the audio processor 105 processes the first audio stream 148, and outputs two resulting processed audio streams 158*a* and 158*b* to the host device 106. In one or more embodiments, the two processed audio streams 158*a* and 158*b* may be produced by duplicating the first audio stream 148, without any modification to the call audio contents. Accordingly, the audio processor 105 may simply pass the first audio stream 148 on to the host device 106 as the processed audio streams 158*a* and 158*b*, without any modifications. In one or more embodiments, the first audio stream 148 may be modified to increase clarity, reduce artifacts, etc. before being sent to the host device 106. For example, the audio processor 105 may perform one or more of echo cancellation, echo reduction, gain control, equalization, volume control, and noise reduction on the first audio stream 148 to generate one or both of the first processed audio stream 158*a* and the second processed audio stream 158*b*. As a more specific example, the audio processor 105 may perform one or more of echo cancellation, echo reduction, gain control, equalization, volume control, and noise reduction on the first audio stream 148 to generate the first processed audio stream 158*a*, but forgo performing such processing on the second processed audio stream 158*b*. In one or more embodiments, the audio processor 105 may encode, compress, and/or encrypt the first processed audio stream 158*a* and/or the second processed audio stream 158*b*. For example, the audio processor 105 may encode, compress, and/or encrypt the second processed audio stream 158*b*, but forgo encrypting and compressing the first processed audio stream 158*a*. In one or more embodiments, the second processed audio stream 158*b* may include a downsampled version of the call audio in the first audio stream 148 or the first processed audio stream 158*a*. Accordingly, the first processed audio stream 158*a* may be identical to the second processed audio stream 158*b*, may be a more processed version of the second processed audio stream 158*b*, or may be a less processed version of the second processed audio stream 158*b*. In one or more embodiments, the audio processor 105 may generate metadata describing the contents of the first audio stream 148, which is output with the processed audio streams 158*a*, 158*b*, and 158*c*.

Still referring to FIG. 1D, concurrent with the above-described processing of the first audio stream 148, the audio processor 105 also outputs a third processed audio stream 158*c* to the host device 106, where the third processed audio stream 158*c* includes the call audio of the received audio stream 156. In one or more embodiments, the third processed audio stream 158*c* may be produced by duplicating the received audio stream 156 or the second audio stream 146. Accordingly, the audio processor 105 may simply pass the received audio stream 156 or the second audio stream 146 on to the host device 106 as the third processed audio stream 158c, without any modifications. Thus, the third processed audio stream 158c may include any artifacts or noise in the call audio, as received from the host device 106, or may reflect the modified call audio that is heard by the near-end speaker at the headset 104 after the audio processor 105 performs one or more of echo cancellation, echo reduction, gain control, equalization, volume control, noise reduction, acoustic exposure limiting, and acoustic event identification on the received audio stream 156 to generate the second audio stream 146. In one or more embodiments, the third processed audio stream 158c may include a down-sampled version of the call audio in the received audio stream 156 or the second audio stream 146.

As illustrated in FIG. 1D, the host device 106 receives each of the three processed audio streams 158a, 158b, and 158c, and forwards on to the network 110 as outbound audio streams 168a, 168b, and 168c, respectively. In one or more embodiments, prior to forwarding the processed audio streams 158 as the outbound audio streams 168, one or more of the processed audio streams 158a, 158b, and 158c may be further processed by the host device 106. For example, the host device 106 may encode, compress, and/or encrypt one or more of the three processed audio streams 158a, 158b, and 158c to generate the outbound audio streams 168a, 168b, and 168c, respectively. For example, the host device 106 may encrypt the two outbound audio streams 168b and 168c. The first outbound audio stream 168a is addressed for delivery over the network 110 to the far-end telephony device 132. The second outbound audio stream 168b and the third outbound audio stream 168c are both addressed for delivery over the network 110 to the remote server 112. The outbound audio streams 168 are transmitted concurrently by the host device 106. Thus, the remote server 112 receives the second outbound audio stream 168b, containing call audio originating from the near-end speaker, and the third outbound audio stream 168c, containing call audio originating from the far-end speaker, near real-time with the far-end speaker receiving the first outbound audio stream 168a, which contains call audio originating from the near-end speaker. As an option, the host device 106 may store any of the outbound audio streams 168 locally or to an attached storage device.

The remote server 112 may receive and analyze call audio as the call progresses. Moreover, because the remote server 112 receives call audio originating from the far-end speaker in a separate stream than the call audio originating from the near-end speaker, the remote server 112 may store and analyze the second and third outbound audio streams 168b and 168c without the speaker separation issues that are inherent to current call recording systems. Further still, because the remote server 112 may include any network connected server capable of receiving the second and third outbound audio streams 168b and 168c over an IP network, call recording and analysis may occur without specialized hardware being installed proximate to the host device 106.

In one or more embodiments, metadata describing the contents of the first audio stream 148 and/or metadata describing the contents of the received audio stream 156 may be sent along with the outbound audio streams 168 to the remote server 112 (not shown). The metadata may be generated by the audio processor 105 and/or the host device 106. As described above, the metadata may offer insight into the contents of the outbound audio streams 168, and may be used to trigger the storage and/or analysis of the second and third outbound audio streams 168b and 168c. For example, metadata generated by the audio processor 105 that describes a signal envelope of the call audio in the second outbound audio stream 168b may trigger the storage and/or analysis of the second outbound audio stream 168b at the remote server 112. As another example, metadata generated by the audio processor 105 that describes user manipulation of volume controls on the audio processor 105 may trigger the storage and/or analysis of the second outbound audio stream 168b and/or the third outbound audio stream 168c at the remote server 112. Thus, issues adversely affecting call center agents may be identified and confirmed in near real-time by the remote server 112 using metadata and call audio in the second and/or third outbound audio streams 168b and 168c.

Although FIG. 1D is shown and described with the call audio passing through the softphone client 128 of the near-end speaker, it is understood that the above description may be applicable to other near-end telephony devices, such as the mobile phone 131 and the desktop phone 133. For example, the audio processor 105 may be communicatively coupled to the desktop phone 133 by way of a pair of transmit/receive channels 153, which may be within, for example, an analog desk phone connection. Similarly, the audio processor 105 may be communicatively coupled to the mobile phone 131 by way of a pair of transmit/receive channels 151, which may be embodied as, for example, a USB, Wi-Fi, or Bluetooth connection. Thus, the mobile phone 131 may be configured to concurrently send the outbound audio streams 168 over the network 110, in lieu of the host device 106. In other words, the mobile phone 131 may include a VoIP client such that the mobile phone 131 is capable of performing substantially the same functionality as the host device 106 is herein described to perform.

As an option, the mobile phone 131 may be configured to concurrently send the first outbound audio stream 168a over a first network connection (e.g., cellular voice, etc.) and the second and third outbound audio streams 168b and 168c over a second network connection (e.g., Wi-Fi, cellular data, etc.). As an option, the mobile phone 131 may be configured to send the first outbound audio stream 168a over a first network connection, while the host device 106 concurrently sends the second and third outbound audio streams 168b and 168c over a second network connection. Accordingly, the audio processor 105 may simultaneously communicate with each of the mobile phone 131, the host device 106, and the headset 104. Similarly, the desktop phone 133 may be configured to output the first outbound audio stream 168a for delivery to the far-end telephony device 132, while the host device 106 concurrently sends the second and third outbound audio streams 168b and 168c over the network 110. Accordingly, the audio processor 105 may simultaneously communicate with each of the desktop phone 133, the host device 106, and the headset 104. In one or more embodiments, the audio processor 105 may be directly connected to the network 110, such that two or more of the processed audio streams 158 (e.g., the second and third processed audio streams 158b and 158c, etc.) are addressed and transmitted by the audio processor 105 for delivery at the remote server 112. In such embodiments, the near-end telephony device (i.e., the desktop phone 133 or mobile phone 131, etc.) may receive the received audio stream 166 and output the first processed audio stream 158a over any suitable network to the far-end telephony device 132 (e.g., cellular, PSTN, VoIP, etc.).

Figure 1E:
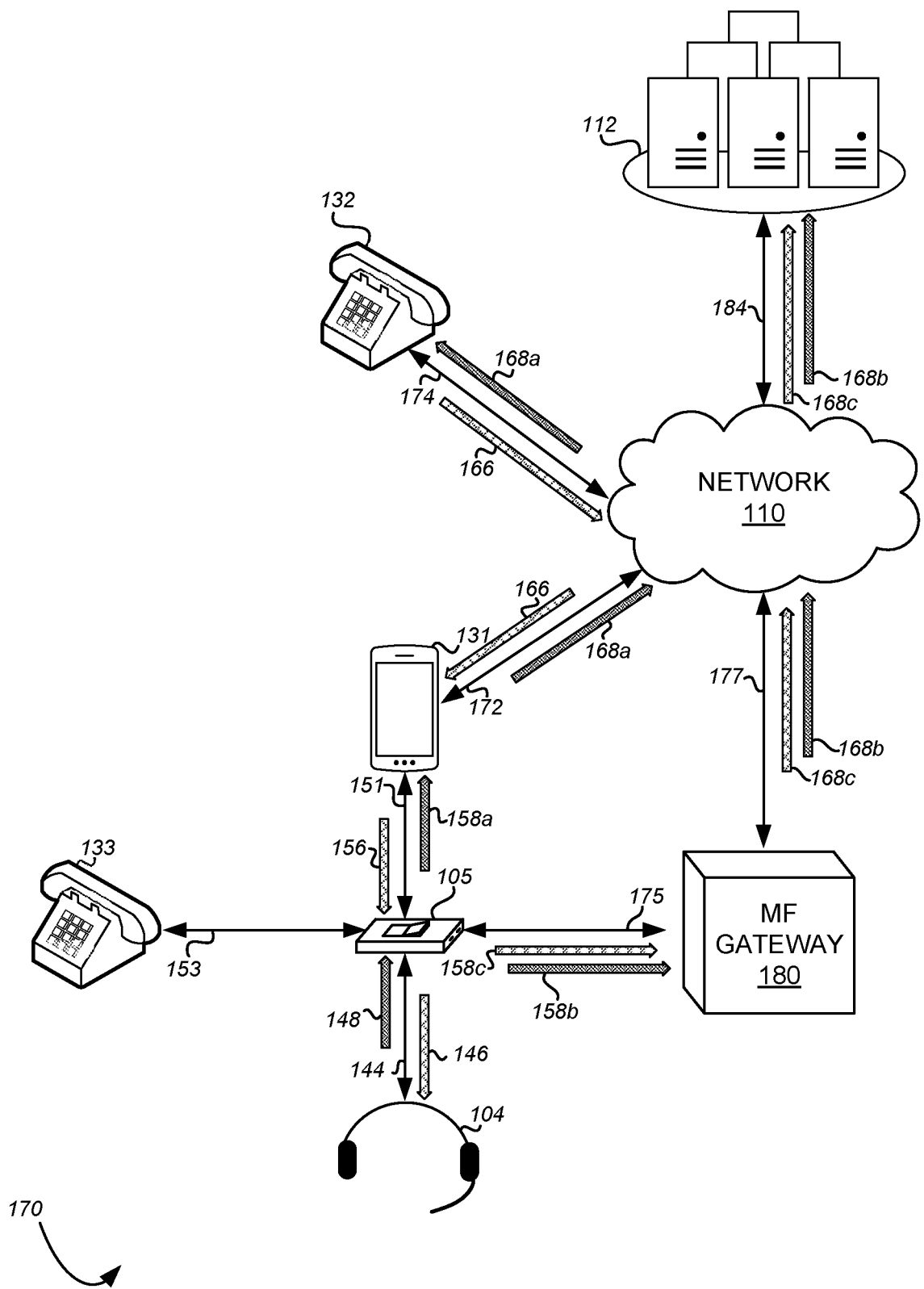

FIG. 1E shows a view of a system 170, according to one or more embodiments. Although the elements of the system 170 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1E may be omitted, repeated, and/or substituted. Accordingly, various embodiments may lack one or more of the features shown. For this reason, embodiments of the invention should not be considered limited to the specific arrangements of elements shown in FIG. 1E.

Other than the replacement of the host device 106 with a media forking gateway 180, and the use of the mobile phone 131 as the local endpoint for an active call, the system 170 of FIG. 1E is substantially similar to the system 100 described in reference to FIG. 1D, above. In other words, in the context of the system 170 of FIG. 1E, it is understood that an active call is ongoing between the far-end telephony device 132 and a user that is wearing the headset 104 connected to the audio processor 105, and the mobile phone 131 is the local call endpoint rather than a softphone application executing on the host device 106 of FIG. 1D. As noted above, the audio processor 105 receives a first audio stream 148 from the headset 104, and transmits a second audio stream 146 to the headset 104. As illustrated in FIG. 1E, call audio of the second audio stream 146 begins as a transmitted audio stream 166 from the far-end telephony device 132, traverses the network 110, and is received at the mobile phone 131. The audio stream 166 may be transmitted as an analog audio signal between one or more telephone exchanges, and/or as a digital signal, such as packets over an IP network. Via a pair of transmit/receive channels 172, the mobile phone 131 receives the transmitted audio stream 166 originating from the far-end telephony device 132. The mobile phone 131 processes call audio of the received audio stream 166 and forwards the same to the audio processor 105 as received audio stream 156. In one or more embodiments, the pair of transmit/receive channels 172 may include, for example, a cellular or Wi-Fi connection. The mobile phone 131 may reconstruct the audio stream 166 before forwarding the received audio stream 156 to the audio processor 105 over the pair of transmit/receive channels 151.

As depicted in FIG. 1E, the audio processor 105 is communicatively coupled to the media forking gateway 180 via transmit/receive channels 175, and the media forking gateway 180 is coupled to the network 110 via transmit/receive channels 177. The transmit/receive channels 175 and 177 may include any wired and/or wireless communication medium. Also, as illustrated in FIG. 1E, the audio processor 105 processes the first audio stream 148, and outputs two resulting processed audio streams 158a and 158b. The first processed audio stream 158a is output by the audio processor 105 to the mobile phone 131 and the second processed audio stream 158b is output to the media forking gateway 180. The processed audio streams 158a and 158b may be generated as described above, in the context of FIG. 1D. For example, the audio processor 105 may perform one or more of echo cancellation, echo reduction, gain control, equalization, volume control, and noise reduction on the first audio stream 148 to generate one or both of the first processed audio stream 158a and the second processed audio stream 158b. A contents of the first processed audio stream 158a may be transmitted by the mobile phone 131 as a first outbound audio stream 168a, for receipt by the far-end telephony device 132.

Still referring to FIG. 1E, concurrent with the output of the first processed audio stream 158a and the second processed audio stream 158b, the audio processor 105 also outputs a third processed audio stream 158c to the media forking gateway 180. As described above, the third processed audio stream 158c includes the call audio of the received audio stream 156, and the third processed audio stream 158c may be generated by duplicating the received audio stream 156 or the second audio stream 146.

Accordingly, the media forking gateway 180 receives, as the second processed audio stream 158b, a copy of the call audio picked up by a microphone of the headset 104 in the first audio stream 148; and also receives, as the third processed audio stream 158c, a copy of the call audio from the far-end telephony device 132 in the audio stream 156. The media forking gateway 180 includes any network-connected device configured to receive one or more audio streams from the audio processor 105, and to relay the one or more received audio streams to the remote server 112. The media forking device 180 may include a network interface, an audio processor client, and/or communications interface, as described in the context of the host device 106 of FIG. 1C. Accordingly, as illustrated in FIG. 1E, the media forking gateway 180 receives the second processed audio stream 158b and the third processed audio stream 158c, the contents of which are forwarded to the remote server 112 as outbound audio streams 168b and 168c, respectively. In one or more embodiments, prior to sending the outbound audio streams 168b and 168c, one or both of the processed audio streams 158b and 158c may be further processed by the media forking gateway 180. For example, the media forking gateway may encode, compress, and/or encrypt one or more of the processed audio streams 158b and 158c to generate the outbound audio streams 168b and 168c, respectively. More specifically, for example, the media forking gateway 180 may encrypt the two outbound audio streams 168b and 168c. As described above, the second outbound audio stream 168b and the third outbound audio stream 168c are both addressed for delivery over the network 110 to the remote server 112. As an option, transmission of the outbound audio streams 168b and 168c may be scheduled for times of reduced network traffic. The outbound audio streams 168b and 168c may be transmitted concurrently by the media forking gateway 180 such that the remote server 112 simultaneously receives the second outbound audio stream 168b, containing call audio originating from the near-end speaker, and the third outbound audio stream 168c, containing call audio originating from the far-end speaker.

The media forking gateway 180 may be on the same LAN as the audio processor 105 and/or the mobile phone 131. A plurality of additional audio processors may also reside on the same LAN, such that the media forking gateway 180 relays the audio streams of each of the audio processors. In one or more embodiments, the media forking gateway 180 may store a local copy of one or both of the processed audio streams 158b and 158c, or any other audio streams that it relays to the remote server 112. Thus, the media forking gateway 180 may act as a single point of service for a plurality of local audio processors, and for mediating the transfer of audio streams from those audio processors to the remote server 112. In this way, the media forking gateway 180 may collect call audio for several phone calls, from a plurality of network-connected audio processors. The media forking gateway 180 may serve as a local device that retains, temporarily or permanently, a copy of both near-end and far-end call audio for telephone calls, as received from such audio processors. Also, the media forking gateway 180 may coordinate the delivery of such call audio to the remote server 112 for further analysis and storage. The media forking gateway 180 may alleviate the burden on network resources of numerous audio processors concurrently and/or continuously sending outbound audio streams to the remote server 112, as well as mitigate security and privacy concerns associated with storing call audio remotely, such as on the remote server 112.

Although the deployment of the media forking gateway 180 is described in the context of the mobile phone 131 being the local call endpoint, it is understood that any other near-end telephony device is equally applicable. For example, the desktop phone 133 or a softphone client may be used as the call endpoint instead of the mobile phone 131, and the operation of the audio processor 105 and media forking gateway 180 would be substantially unchanged.

Figure 2:
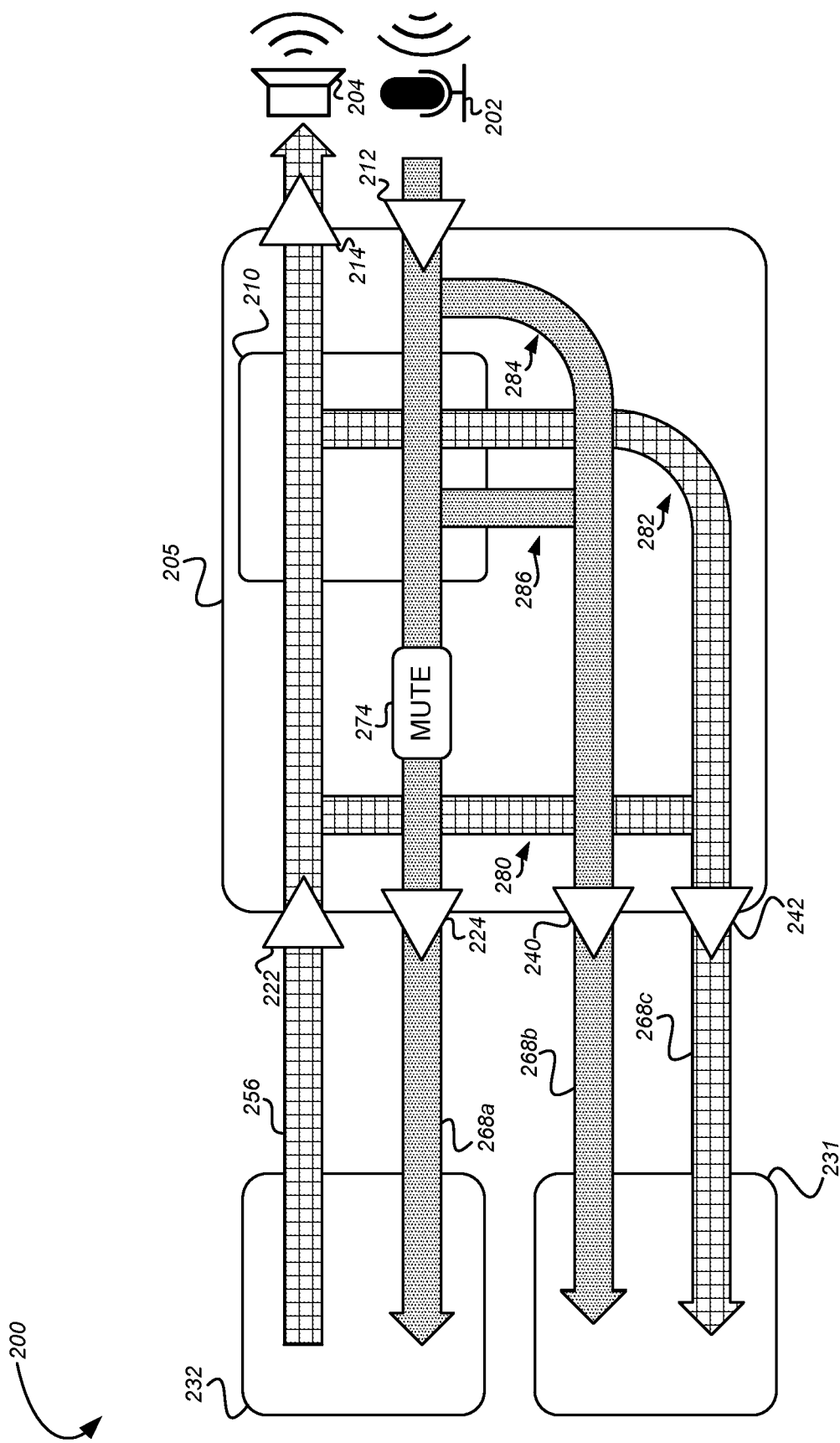
FIG. 2 depicts a system for forking transmit and receive call audio channels, in accordance with one or more embodiments of the invention.

FIG. 2 shows a block diagram of a system 200 for forking transmit and receive channels of call audio, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

Referring to FIG. 2, the system 200 includes an audio processor 205, which may be substantially identical to the audio processor 105, described above in the context of FIGS. 1A-1E. The audio processor 205 includes a first receive channel 212 for receiving a first signal from a microphone 202, and a first transmit channel 214 for transmitting a second signal to a speaker 204. The first signal received from the microphone 202 may include an analog or digital signal. The microphone 202 and the speaker 204 may be included in a headset worn by a near-end speaker, such as the headset 104, described above. According, the first signal includes an audio stream of call audio spoken by a near-end speaker, and the second signal includes an audio stream of call audio spoken by a far-end speaker. In the context of the present description, the far end speaker is located at a far-end telephony device 232.

Further, the audio processor 205 is shown to include a second receive channel 222 via which the audio processor 205 receives an audio stream 256 that originates from the far-end telephony device 232. Also, the audio processor 205 includes a second transmit channel 224 via which the audio processor 205 outputs a first outbound audio stream 268a for delivery to the far-end telephony device 232. As described above, the received audio stream 256 and the first outbound audio stream 268a may be transported over any combination of suitable networks.

Still yet, the audio processor 205 is shown to include a third transmit channel 240 via which the audio processor 205 transmits a second outbound audio stream 268b for receipt by a remote server 231. Also, the audio processor 205 includes a fourth transmit channel 242 via which the audio processor 205 transmits a third outbound audio stream 268c for receipt by the remote server 231. The remote server 231 may be substantially identical to the remote server 112, described above in the context of FIGS. 1A-1E.

One or both of the audio streams 268b and 268c may be encoded, compressed, and/or encrypted by the audio processor 105 before being output at the transmit channels 240 and 242, respectively. As an option, the transmit channels 224, 240, and 242 may be configured as a single audio endpoint or numerous different audio endpoints for capture by a host device. For example, the transmit channels 224, 240, and 242 may reside within a single USB connection or wireless link. The audio processor 205 may decode the call audio in the audio stream 256 upon receipt, and prior to outputting its call audio on the first transmit channel 214 to the speaker 204.

Still referring to FIG. 2, the audio processor 205 is shown to include a signal processing block 210. The signal processing block 210 may be implemented on a hardware processor, such as, for example, the hardware processor 112, described above. In one or more embodiments, the signal processing block 210 may apply one or more of echo cancellation, echo reduction, gain control, equalization, volume control, and noise reduction, to the audio stream in the first signal received on the first receive channel 212. Also, the signal processing block 210 may apply one or more of echo cancellation, echo reduction, gain control, equalization, volume control, noise reduction, acoustic exposure limiting, and acoustic event identification to the call audio in the audio stream 256 prior to output on the first transmit channel 214 to the speaker 204.

As shown in FIG. 2, the audio processor 205 is configured to include multiple paths to the fourth transmit channel 242. In particular, the audio processor 205 is configured such that the third outbound audio stream 268c may be output by the audio processor 205 without processing by the signal processing block 210, via a first path 280; or may be passed to the fourth transmit channel 242, via a second path 282, after being processed by the signal processing block 210. When the first path 280 is utilized, call audio delivered to the remote server 231 in the third outbound audio stream 268c may represent the call audio as received over the network, without modification by the audio processor 105, from the far-end telephony device 232. However, when the second path 282 is utilized, call audio delivered to the remote server 231 in the third outbound audio stream 268c may represent the call audio as heard from the speaker 204 by a user, after being processed by the signal processing block 210.

Also, the audio processor 205 is configured to include multiple paths to the third transmit channel 240. In particular, the audio processor 205 is configured such that the second outbound audio stream 268b may be output by the audio processor 205 without processing by the signal processing block 210, via a first path 284; or may be passed to the third transmit channel 240, via a second path 286, after being processed by the signal processing block 210. When the first path 284 is utilized, call audio delivered to the remote server 231 in the second outbound audio stream 268b may represent audio picked up by the microphone 202, without modification. However, when the second path 286 is utilized, call audio delivered to the remote server 231 in the second outbound audio stream 268b may represent the call audio as intended to be heard by a user at the far-end telephony device 232. Thus, the audio processor 105 may configured to selectively transmit pre-processed or post-processed call audio, from both the near-end speaker and far-end speaker, for analysis at the remote server 231. For example, in situations where a call center agent on a near-end telephony device is asking the far-end speaker to repeat themselves multiple times during a call, or where the agent on the near-end telephony device is continuously attempting to increase the volume of received call audio, the post-processed call audio (i.e., from the second path 286) may obscure the fact that the agent is working in a noisy environment or has an ill-fitting headset. Accordingly, pre-processed call audio from the first path 284 may provide insight into the audio levels and patterns of the environment within which the agent is working, and which may be removed by noise cancellation algorithms to improve the call quality with the far-end caller.

As depicted in FIG. 2, both the first path 284 and the second path 286 are tapped prior to a mute control block 274 that precedes the transmit channel 224. The mute control block 274 is operable to mute outbound audio on the transmit channel 224, responsive to input from the near-end user. Accordingly, regardless of whether the first path 284 or the second path 286 is selected, the second outbound audio stream 268b may include audio from the near-end speaker that is not heard by the far-end caller. In one or more embodiments in which the audio processor 205 provides metadata to the remote server 231, conversations occurring at the near-end while the mute control block 274 is active may offer valuable insight into the problems or activities of call center agents.

The second and third outbound audio streams 268b and 268c may be packetized and sent to the remote server 231 using standard protocols such as SIP, RTP and/or RTCP. The packets of the second and third outbound audio streams 268b and 268c may be multiplexed and transported over a single network interface. As an option, to reduce processing overhead and bandwidth usage, the audio in the second and third outbound audio streams 268b and/or 268c may be sampled at a lower rate than the audio in the first outbound audio stream 268a. For example, if the first outbound audio stream 268a is sampled at 16 kHz, the second and third outbound audio streams 268b and/or 268c may be sampled at 8 kHz.

In one or more embodiments, the outbound audio streams 268 may be received and processed by another device, such as a host device, prior to being transmitted to the far-end telephony device 232 and the remote server 231. These operations have been discussed above, in the context of FIGS. 1D and 1E for example, and have been omitted from the discussion of FIG. 2 for purposes of simplicity and clarity. Such a host device may selectively control which codec is being used to encode and/or compress the outbound audio streams 268 of the audio processor 205. Such a host device may selectively control whether the second outbound audio stream 268b from the third transmit channel 240 is generated using the first path 284 or the second path 286 for near-end call audio. Such a host device may selectively control whether the third outbound audio stream 268c from the fourth transmit channel 242 is generated using the first path 280 or the second path 282 for call audio received from the far-end speaker.

Figure 3:
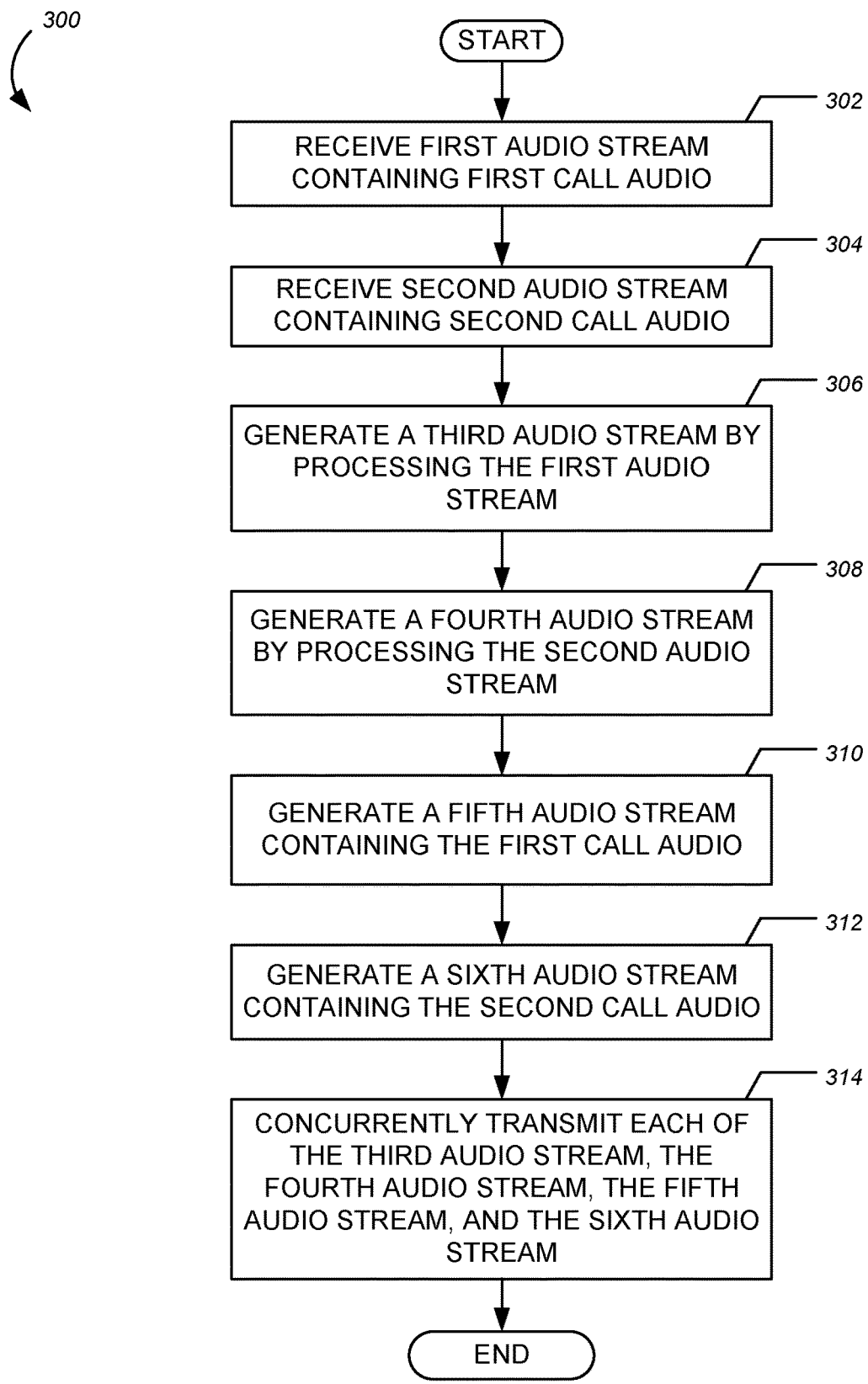
FIG. 3 is a flow diagram showing a method for forking transmit and receive call audio channels, in accordance with one or more embodiments of the invention.

FIG. 3 shows a flowchart of a method 300 for forking transmit and receive call audio channels, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

It is understood that all of the steps of the method 300 are performed during an active phone call between a near-end speaker and a far-end speaker. For purposes of clarity and brevity, this is not repeated below for each of the steps 302-314. In one or more embodiments, the steps of the method 300 may be performed by an audio processor, such as the audio processor 105 described in the context of FIGS. 1A-1E, or the audio processor 205 described in the context of FIG. 2, above. In one or more embodiments, the steps of the method 300 may be performed by an audio processor in concert with a near-end telephony device, such as a host device.

At step 302, a first audio stream is received. The first audio stream includes first call audio that originates from a far-end telephony device. Accordingly, the first call audio includes speech from a far-end speaker. The first audio stream may be received via a first receive channel. The first receive channel may be embodied on a communications interface, such as a corded or cordless link with near-end telephony device, such as a host device, mobile phone, or desktop phone. The near-end telephony device may receive the first call audio via a network.

At step 304, a second audio stream is received. The second audio stream includes second call audio that originates from a microphone of a near-end headset. Accordingly, the second call audio includes speech from a near-end speaker. The second audio stream may be received via a second receive channel. The second receive channel may be embodied on an audio interface, such as a corded or cordless link with the headset.

At step 306, a third audio stream is generated by processing the first audio stream. In one or more embodiments, processing the first audio stream includes one or more of decoding and decompressing the first audio stream. Such processing may rely on one or more stored codecs or keys. In one or more embodiments, processing the first audio stream includes performing one or more of echo cancellation, echo reduction, gain control, equalization, volume control, noise reduction, acoustic exposure limiting, and acoustic event identification on the first audio stream. Such processing may rely on one or more stored signal processing algorithms or signal processing blocks. The third audio stream contains the first call audio.

At step 308, a fourth audio stream is generated by processing the second audio stream. In one or more embodiments, processing the second audio stream includes one or more of encoding, compressing, and encrypting the second audio stream. Such processing may rely on one or more stored codecs or keys. In one or more embodiments, processing the second audio stream includes performing one or more of echo cancellation, echo reduction, gain control, equalization, volume control, and noise reduction on the second audio stream. Such processing may rely on one or more stored signal processing algorithms or signal processing blocks. The fourth audio stream contains the second call audio.

At step 310, a fifth audio stream is generated. The fifth audio stream contains the first call audio. The fifth audio stream may be generated by duplicating the first audio stream or the third audio stream. Accordingly, the fifth audio stream may include the first call audio with or without the processing that has been applied to generate the third audio stream.

At step 312, a sixth audio stream is generated. The sixth audio stream contains the second call audio. The sixth audio stream may be generated by duplicating the second audio stream or the fourth audio stream. Accordingly, the sixth audio stream may include the second call audio with or without the processing that has been applied to generate the fourth audio stream.

At step 314, the third audio stream, the fourth audio stream, the fifth audio stream, and the sixth audio stream are concurrently output. The third audio stream, containing the first call audio, is output for receipt by a speaker of the near-end headset. The fourth audio stream, containing the second call audio, is output for receipt by the far-end telephony device. The fifth audio stream, containing the first call audio, is output for receipt by a predetermined destination. Also, the sixth audio stream, containing the second call audio, is output for receipt by the predetermined destination. In one or more embodiments, the predetermined destination includes a local host device. The host device may host a softphone client. The host device may forward the fifth audio stream and the sixth audio stream on to a remote server. The host device may further process the fifth audio stream and the sixth audio stream prior to transmitting to the remote server. In one or more embodiments, the predetermined destination includes the remote server.

In one or more embodiments, the first audio stream may be analyzed by the audio processor and/or the host device. In one or more embodiments, the second audio stream may be analyzed by the audio processor and/or the host device. In one or more embodiments, the fifth audio stream may be analyzed by the audio processor and/or the host device. In one or more embodiments, the sixth audio stream may be analyzed by the audio processor and/or the host device. Based on the analysis of the audio stream(s), metadata may be generated. In such embodiments, the metadata may be transmitted with the fifth audio stream and the sixth audio stream for receipt by the predetermined destination. Where the predetermined destination includes a remote server, the remote server may store and/or analyze the metadata in conjunction with the call audio in the fifth and sixth audio streams for insight into the call. Because the fifth and sixth audio streams are received independently, the near-end speech and far-end speech are received in separate streams. This separation may expedite call analysis, and facilitate generation of more accurate analytics when compared to an analysis of a single audio stream in which the call audio of the far-end and near-end are combined. Moreover, because the fifth and sixth audio streams are received over a standard network, the remote server may be located virtually anywhere, whether within the near-end agent's enterprise, or within a third-party hosted service.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method for forking transmit and receive call audio channels, comprising:
    during an active call, receiving a first audio stream of first call audio that originates from a far-end telephony device;
    during the active call, receiving a second audio stream of second call audio that originates from a microphone of a near-end headset;
    during the active call, generating a third audio stream containing the first call audio by processing the first audio stream;
    during the active call, generating a fourth audio stream containing the second call audio by processing the second audio stream;
    during the active call, generating a fifth audio stream containing the first call audio;
    during the active call, generating a sixth audio stream containing the second call audio;
    during the active call, concurrently transmitting:
        the third audio stream for output by a speaker of the near-end headset, and
        the fifth audio stream for receipt by a predetermined destination; and
    during the active call, concurrently transmitting:
        the fourth audio stream for receipt by the far-end telephony device, and
        the sixth audio stream for receipt by the predetermined destination.

2. The method of claim 1, wherein the predetermined destination includes a remote server.

3. The method of claim 1, wherein the predetermined destination includes a local host device.

4. The method of claim 1, comprising:
    performing an analysis of at least one of the first audio stream and the second audio stream;

generating metadata based on the analysis; and
transmitting the metadata for receipt by the predetermined destination.

5. The method of claim 4, wherein the predetermined destination includes a remote server.

6. The method of claim 1, wherein generating the fifth audio stream includes duplicating the first audio stream as received.

7. The method of claim 1, wherein generating the fifth audio stream includes duplicating the third audio stream that is generated by processing the first audio stream.

8. The method of claim 1, wherein generating the sixth audio stream includes duplicating the second audio stream as received.

9. The method of claim 1, wherein generating the sixth audio stream includes duplicating the fourth audio stream that is generated by processing the second audio stream.

10. A system for forking transmit and receive call audio channels, comprising:
at least one processor; and
at least one memory coupled to the at least one processor, the at least one memory having stored therein instructions which, when executed by the at least one processor, cause the at least one processor to perform a process, the process including:
during an active call, receiving a first audio stream of first call audio that originates from a far-end telephony device;
during the active call, receiving a second audio stream of second call audio that originates from a microphone of a near-end headset;
during the active call, generating a third audio stream containing the first call audio by processing the first audio stream;
during the active call, generating a fourth audio stream containing the second call audio by processing the second audio stream;
during the active call, generating a fifth audio stream containing the first call audio;
during the active call, generating a sixth audio stream containing the second call audio;
during the active call, concurrently transmitting:
the third audio stream for output by a speaker of the near-end headset, and
the fifth audio stream for receipt by a predetermined destination; and
during the active call, concurrently transmitting:
the fourth audio stream for receipt by the far-end telephony device, and
the sixth audio stream for receipt by the predetermined destination.

11. The system of claim 10, wherein the predetermined destination includes a remote server.

12. The system of claim 10, wherein the instructions, when executed by the at least one processor, cause the at least one processor to perform the process, the process further including:
performing an analysis of at least one of the first audio stream and the second audio stream;
generating metadata based on the analysis; and
transmitting the metadata for receipt by the predetermined destination.

13. The system of claim 12, wherein the predetermined destination includes a remote server.

14. The system of claim 10, wherein the instructions, when executed by the at least one processor, cause the at least one processor to perform the process, the process further including at least one of decoding and decompressing the first audio stream before generating the third audio stream.

15. The system of claim 14, wherein the at least one processor generates the fifth audio stream by duplicating the first audio stream after performing the at least one of decoding and decompressing.

16. The system of claim 10, wherein the at least one processor generates the fifth audio stream by duplicating the third audio stream.

17. The system of claim 10, wherein the sixth audio stream is at least one of encoded, compressed, and encrypted prior to being transmitted.

18. The system of claim 10, wherein the at least one processor generates the sixth audio stream by duplicating the second audio stream.

19. A system for forking transmit and receive call audio channels, comprising:
a first receive channel configured to receive first call audio from a microphone of a headset;
a second receive channel configured to receive second call audio that originates from a far-end telephony device;
a signal processing block configured to generate processed first call audio by processing the first call audio, and to generate processed second call audio by processing the second call audio;
a first transmit channel configured to transmit the processed first call audio, as a first audio stream, for receipt by the far-end telephony device;
a second transmit channel configured to transmit the processed second call audio, as a second audio stream, to a speaker of the headset;
a third transmit channel configured to receive the first call audio via a first path that bypasses the signal processing block, and to receive the processed first call audio via a second path, wherein the third transmit channel is configured to selectively output, as a third audio stream, one of the first call audio and the processed first call audio;
a fourth transmit channel configured to receive the second call audio via a third path that bypasses the signal processing block, and to receive the processed second call audio via a fourth path, wherein the fourth transmit channel is configured to selectively output, as a fourth audio stream, one of the second call audio and the processed second call audio; and
a mute control block configured to selectively mute the processed first call audio on the first transmit channel.

20. The system of claim 19, wherein the selectively muting is responsive to input from a near-end user.

* * * * *